United States Patent [19]
Matsushita

[11] Patent Number: 5,331,933
[45] Date of Patent: Jul. 26, 1994

[54] CONTROL DEVICE FOR INTERNAL COMBUSTION ENGINE

[75] Inventor: Souichi Matsushita, Susono, Japan

[73] Assignee: Toyota Jidosha Kabushiki Kaisha, Toyota, Japan

[21] Appl. No.: 965,578

[22] Filed: Oct. 23, 1992

[30] Foreign Application Priority Data

Oct. 25, 1991 [JP] Japan .................. 3-279844

[51] Int. Cl.$^5$ ............... F02D 41/40; F02B 17/00
[52] U.S. Cl. .................... 123/295; 123/300; 123/435; 123/436
[58] Field of Search ............... 123/295, 299, 300, 305, 123/431, 435, 436

[56] References Cited

U.S. PATENT DOCUMENTS

| | | | |
|---|---|---|---|
| 4,667,634 | 5/1987 | Matsumura et al. | 123/357 |
| 4,704,999 | 11/1987 | Hashikawa et al. | 123/299 |
| 4,955,339 | 9/1990 | Sasaki et al. | 123/295 |
| 5,127,328 | 7/1992 | Ito | 123/305 X |
| 5,170,759 | 12/1992 | Ito | 123/305 X |
| 5,215,053 | 6/1993 | Ito | 123/276 |

*Primary Examiner*—Tony M. Argenbright
*Attorney, Agent, or Firm*—Kenyon & Kenyon

[57] ABSTRACT

A control device for an internal combustion engine having a cylinder and a spark plug, the control device including a fuel feeding means for feeding fuel into the cylinder, feeding a part of an amount of fuel to be injected during an intake stroke to form an air-fuel premixture, and feeding the remaining part of the amount of fuel to be injected during a compression stroke to form an air-fuel mixture around the spark plug for ignition; a torque fluctuation detecting means for detecting an amount of torque fluctuation of the internal combustion engine; and a fuel feeding control means for controlling a ratio of the part of the amount of fuel to be injected to the amount of fuel to be injected so that the amount of torque fluctuation detected by the torque fluctuation detecting means is less than a predetermined amount.

15 Claims, 14 Drawing Sheets

|  | Ne₁ | Ne₂ | ----- | Neₙ |
|---|---|---|---|---|
| $(QA/Ne)_1$ | Q₁₁ | Q₁₂ | ----- | Q₁ₙ |
| $(QA/Ne)_2$ | Q₂₁ | Q₂₂ | ----- | Q₂ₙ |
| ⋮ | ⋮ | ⋮ | | ⋮ |
| $(QA/Ne)_n$ | Qₙ₁ | Qₙ₂ | ----- | Qₙₙ |

CONTROL DEVICE FOR INTERNAL COMBUSTION ENGINE

BACKGROUND OF THE INVENTION

1. Field of the Invention

The present invention relates to a control device for an internal combustion engine.

2. Description of the Related Art

Japanese Unexamined Patent Publication (Kokai) No. 2-169834 discloses an internal combustion engine wherein, during low load operation, the entire required amount of fuel injection is injected into the engine cylinders during the compression stroke to form an air-fuel mixture around the spark plugs, while during medium and high load operation, fuel is injected into the engine cylinders during the intake stroke to form an air-fuel premixture and fuel is injected into the engine cylinders during the compression stroke to form an air-fuel mixture for ignition near the spark plugs.

In this internal combustion engine, however, among the load regions in which the amount of fuel injection is divided between the intake stroke and the compression stroke, in the region of low load operation, the suitable ratio of the amount of fuel injection in the intake stroke and the amount of fuel injection in the compression stroke is limited to within a narrow range based on the engine operating state, so in this operating region, it is difficult to always obtain good combustion with a small amount of torque fluctuation.

SUMMARY OF THE INVENTION

An object of the present invention is to provide a control device for an internal combustion engine by which the above problem can be solved.

According to the present invention, there is provided a control device for an internal combustion engine having a cylinder and a spark plug, the control device including a fuel feeding means for feeding fuel into the cylinder, feeding a part of an amount of fuel to be injected during an intake stroke to form an air-fuel premixture, and feeding the remaining part of the amount of fuel to be injected during a compression stroke to form an air-fuel mixture around the spark plug for ignition; a torque fluctuation detecting means for detecting an amount of torque fluctuation of the internal combustion engine; and a fuel feeding control means for controlling a ratio of the part of the amount of fuel to be injected to the amount of fuel to be injected so that the amount of torque fluctuation detected by the torque fluctuation detecting means decreases.

The present invention may be more fully understood from the description of preferred embodiments of the invention set forth below, together with the accompanying drawings.

DESCRIPTION OF THE PREFERRED EMBODIMENTS

Figure 1:
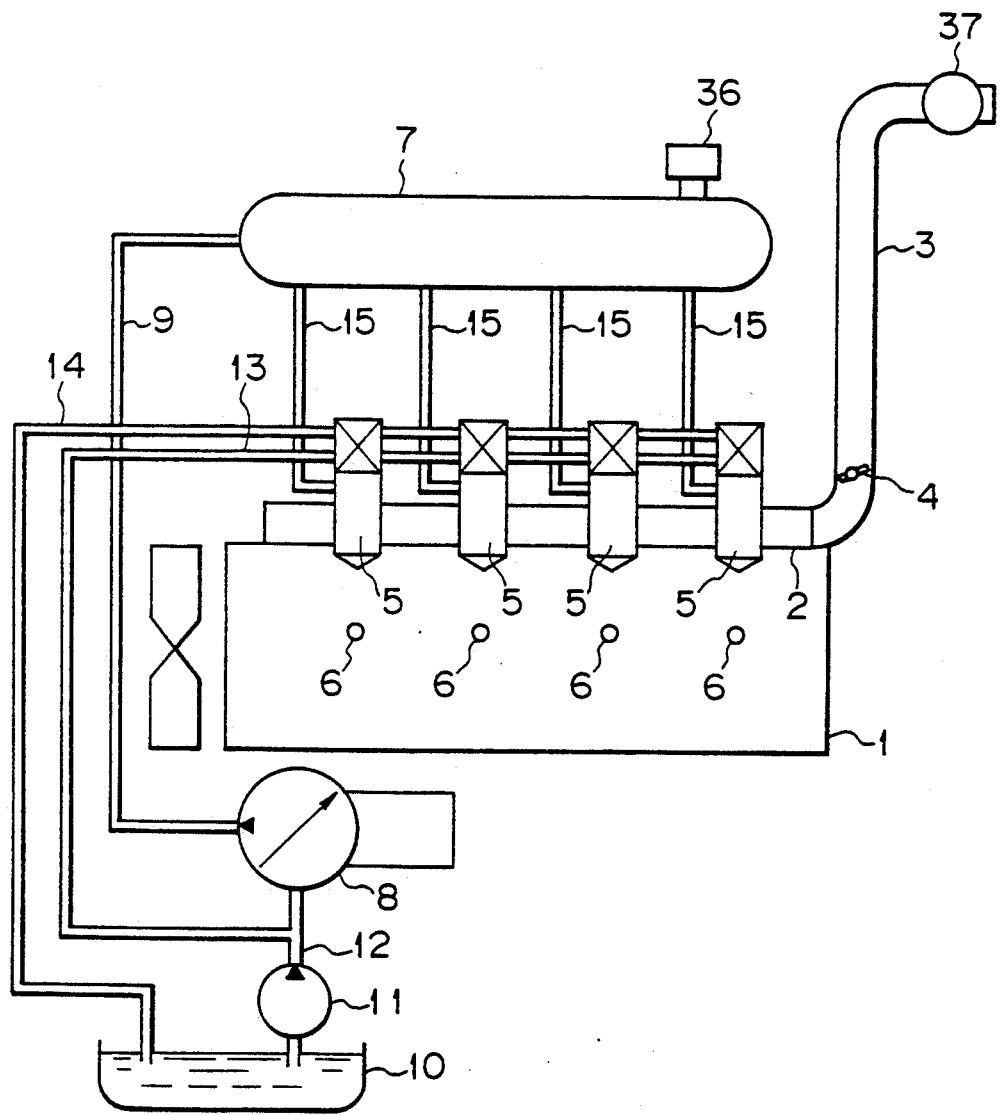
FIG. 1 is an overall view of an internal combustion engine of an embodiment of the present invention.

FIG. 1 is an overall view of an internal combustion engine of an embodiment of the present invention. In FIG. 1, 1 is the engine body, 2 is a surge tank, 3 is an intake pipe extending from the surge tank 2, 4 is a throttle valve provided in the middle of the intake pipe 3, 5 are fuel injectors for directly injecting fuel into the cylinders, 6 are spark plugs, 7 is a high pressure reserve tank, 8 is a high pressure fuel pump with a controllable discharge pressure for sending high pressure fuel under pressure through a high pressure conduit 9 to the reserve tank 7, 10 is a fuel tank, and 11 is a low pressure fuel pump for feeding fuel through a conduit 12 from the fuel tank 10 to the high pressure fuel pump 8. The discharge side of the low pressure fuel pump 11 is connected to a piezoelectric element cooling introduction pipe 13 for cooling the piezoelectric elements of the fuel injectors 5. A piezoelectric element cooling return pipe 14 is linked with the fuel tank 10. Fuel flowing through the piezoelectric element cooling introduction pipe 13 is returned to the fuel tank through this return pipe 14. Branch pipes 15 connect the high pressure fuel injectors 5 to the high pressure reserve tank 7.

A fuel pressure sensor 36 is attached to the high pressure reserve tank 7, which fuel pressure sensor 36 detects the fuel pressure inside the high pressure reserve tank 7. Based on the detected value of the fuel pressure sensor 36, the high pressure fuel pump 8 is controlled so that the fuel pressure inside the high pressure reserve tank 7 becomes the target fuel pressure. At the inlet of the intake pipe 3 is disposed an air flow meter 37 for detecting the amount of intake air QA.

Figure 2:
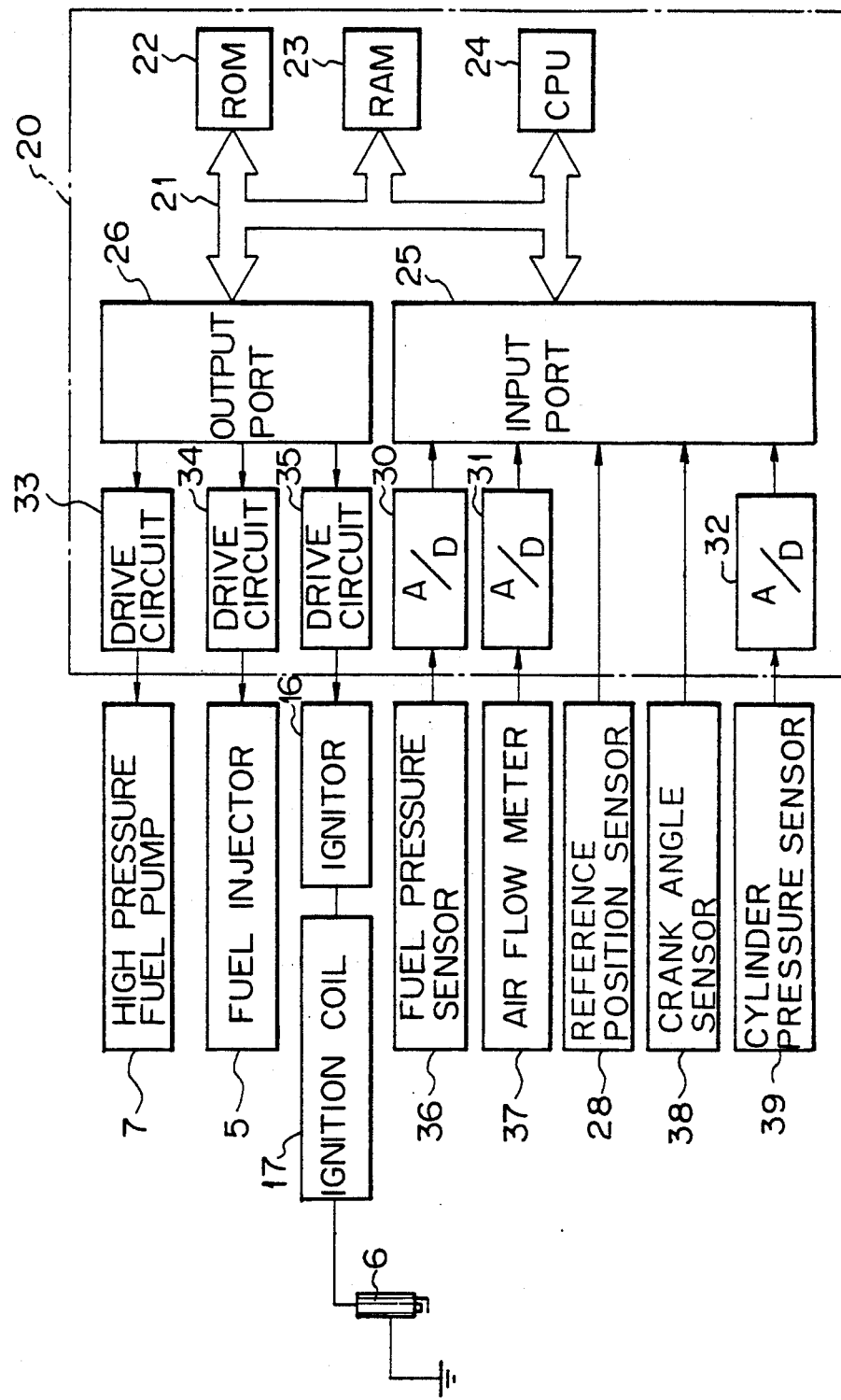
FIG. 2 is a block diagram of an electronic control unit.

FIG. 2 is a block diagram of the constitution of an electronic control unit 20. Referring to FIG. 2, the electronic control unit 20 is comprised of a digital computer. It is provided with a read only memory (ROM) 22, a random access memory (RAM) 23, a microprocessor (CPU) 24, an input port 25, and an output port 26 connected by a bidirectional bus 21.

The fuel pressure sensor 36 and the air flow meter 37 are connected to the input port 25 through the corresponding AD converters 30 and 31. A reference position sensor 28 which generates a reference position detection pulse signal with each 720 degrees crank angle and a crank angle sensor 38 which generates a crank angle detection signal with each 30 degrees crank angle are connected to the input port 25. Further, a cylinder pressure sensor 39 for detecting the absolute pressure inside the engine cylinders (see FIG. 4) is connected via the AD converter 32 to the input port 25.

On the other hand, the output port 26 is connected through the corresponding drive circuits 33 and 34 to the high pressure reserve tank 7 and the fuel injectors 5. Further, the output port 26 is connected through the drive circuit 35 to an ignitor 16. The ignitor 16 is connected through an ignition coil 17 to the spark plugs 6.

Figure 3:
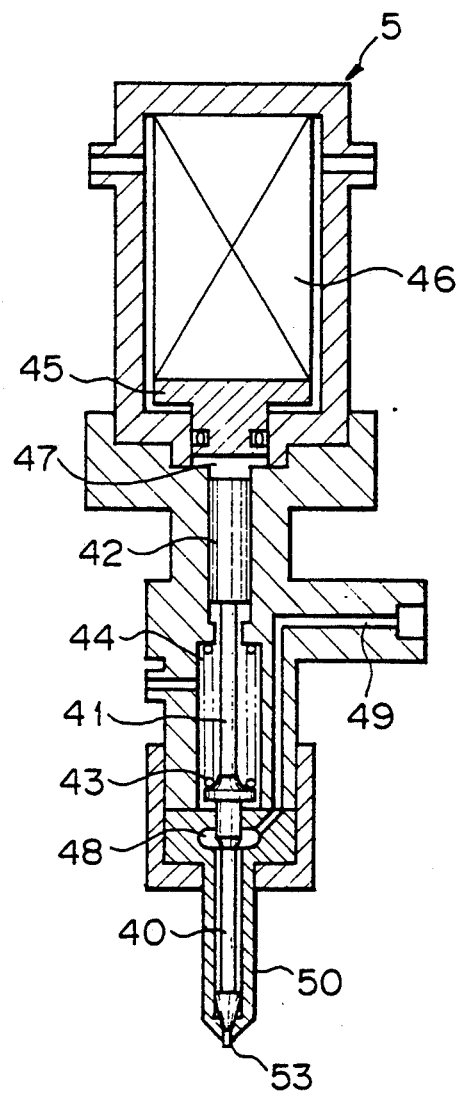
FIG. 3 is a longitudinal sectional view of a fuel injector.

FIG. 3 shows a side sectional view of a fuel injector 5. Referring to FIG. 3, 40 is a needle inserted into a nozzle 50, 41 is a pressurizing rod, 42 is a movable plunger, 43 is a compression spring disposed inside a spring holding chamber 44 and pressing the needle 40 downward, 45 is a pressurizing piston, 46 is a piezoelectric element, 47 is a pressurizing chamber formed between the top surface of the movable plunger 42 and the piston 45 and filled with fuel, and 48 is a needle pressurizing chamber. The needle pressurizing chamber 48 is connected to the high pressure reserve tank 7 (FIG. 1) through a fuel passageway 49 and branch pipes 14 and therefore the high pressure fuel inside the high pressure reserve tank 7 is fed through the branch pipes 14 and the fuel passageway 49 to the inside of the needle pressurizing chamber 48. When the piezoelectric element 46 is charged, the piezoelectric element 46 elongates and thereby the fuel pressure inside the pressurizing chamber 47 is raised. As a result, the movable plunger 42 is pressed downward, and the nozzle opening 53 is held in a closed state by the needle 40. On the other hand, when the piezoelectric element 46 is discharged, the piezoelectric element 46 contracts and the fuel pressure in the pressurizing chamber 47 falls. As a result, the movable plunger 42 rises, so the needle 40 rises and the fuel is injected from the nozzle opening 53.

Figure 4:
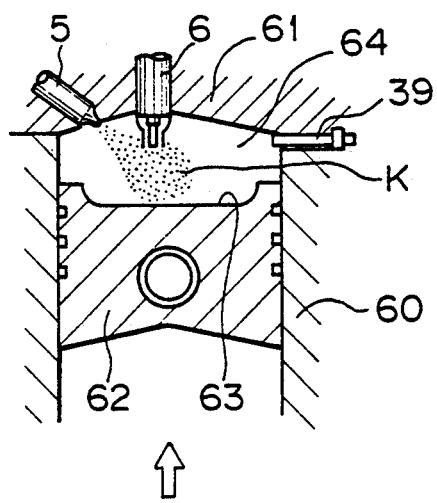
FIG. 4 is a longitudinal sectional view of the engine of FIG. 2.

FIG. 4 is a longitudinal sectional view of the engine of FIG. 2. Referring to FIG. 4, 60 is a cylinder block, 61 is a cylinder head, 62 is a piston, 63 is a substantially cylindrical depression formed in the top surface of the piston 62, and 64 is a cylinder chamber formed between the top surface of the piston 62 and the walls in the cylinder head 61. The spark plug 6 is attached substantially at the center of the cylinder head 61 close to the cylinder chamber 64. While not shown in the figure, an intake port and exhaust port are formed in the cylinder head 61. At the opening of the intake port and exhaust port into the cylinder chamber 64 are disposed an intake valve 66 (see FIG. 7(a)) and an exhaust valve. The fuel injector 5 is a swirl type fuel injector, which injects mist-like fuel with a large dispersion angle and a weak penetrating force. The fuel injector 5 faces downward at a slant and is disposed at the top portion of the cylinder chamber 64. It is disposed so as to inject fuel toward the vicinity of the spark plug 6. The direction of fuel injection and the fuel injection timing of the fuel injector 5 are determined so that the injected fuel goes toward the depression 63 formed in the top portion of the piston chamber 62.

Figure 5:
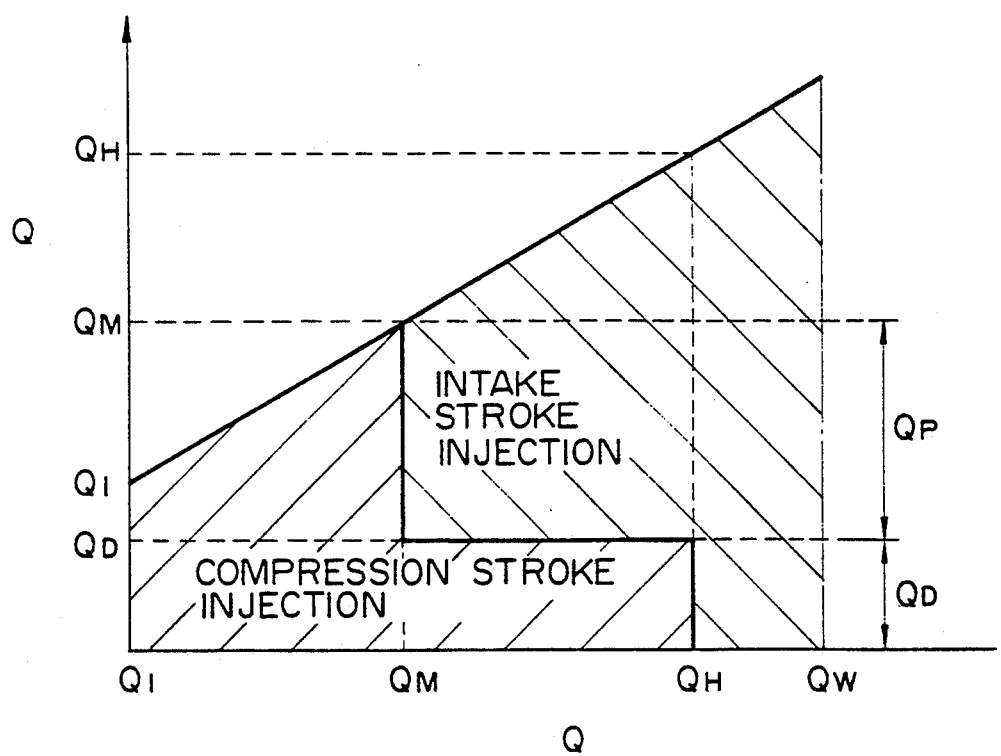
FIG. 5 is a graph of an example of a control pattern of injection in the compression stroke and injection in the intake stroke.

The internal combustion engine of this embodiment is a internal combustion engine able to divide the injection of the amount of fuel between the intake stroke and the compression stroke in accordance with the engine operating state. FIG. 5 shows the ratio of the amount of fuel injection in the intake stroke and the amount of fuel injection in the compression stroke at a predetermined engine rotational speed. Referring to FIG. 5, the horizontal axis shows the load of the engine. In FIG. 5, the amount Q of fuel injection is taken as the load. The vertical axis also shows the amount Q of fuel injection.

When the amount of fuel injection showing the engine load is from the amount of fuel injection during idling $Q_I$ to the amount of fuel injection during medium load $Q_M$, fuel is injected only in the compression stroke. The amount of fuel injection in the compression stroke $Q_C$ is gradually increased from the amount of fuel injection during idling $Q_I$ to the amount of fuel injection during medium load $Q_M$. When the amount of fuel injection showing the engine load exceeds $Q_M$, the amount of fuel injection during the compression stroke is rapidly reduced from $Q_M$ to $Q_D$ and the amount of fuel injection in the intake stroke is rapidly increased to $Q_P$. $Q_M$ is the amount of fuel injection near the medium load and is shown by the following equation as the sum of $Q_D$ and $Q_P$:

$$Q_M = Q_D + Q_P$$

Here, $Q_D$ is the minimum amount of fuel injection in the compression stroke which is able to form an air-fuel mixture ignitable by the spark plug 6 and is an amount smaller than the amount of fuel injection during idling $Q_I$. Further, $Q_P$ is the minimum amount of fuel injection during the intake stroke enabling propagation of the flame ignited by the spark plug 6 when the fuel injected in the intake stroke is uniformly dispersed in the cylinder chamber 64. From the amount of fuel injection during medium loads $Q_M$ to the amount of fuel injection at high loads $Q_H$, the amount of fuel injection is divided between the compression stroke and the intake stroke. The amount of fuel injection during the compression stroke does not depend on the engine load. It is made constant at $Q_D$. The amount of fuel injection during the intake stroke is increased along with the increase of the engine load.

At times of very high loads when the engine load exceeds the amount of fuel injection at high loads $Q_H$ and reaches the maximum amount of fuel injection $Q_M$, since the amount of fuel injection is large, the concentration of the air-fuel premixture in the cylinder chamber formed by the injection in the intake stroke is great enough for ignition, so the injection in the compression stroke for ignition purposes is foregone and the entire required amount of fuel injection is injected in the intake stroke. The amount of fuel injection during high loads $Q_H$ is the minimum amount of fuel injection in the intake stroke able to form a uniform air-fuel mixture which can be ignited by the spark plug even in the case where the fuel is uniformly dispersed in the cylinder chamber.

Figure 6:
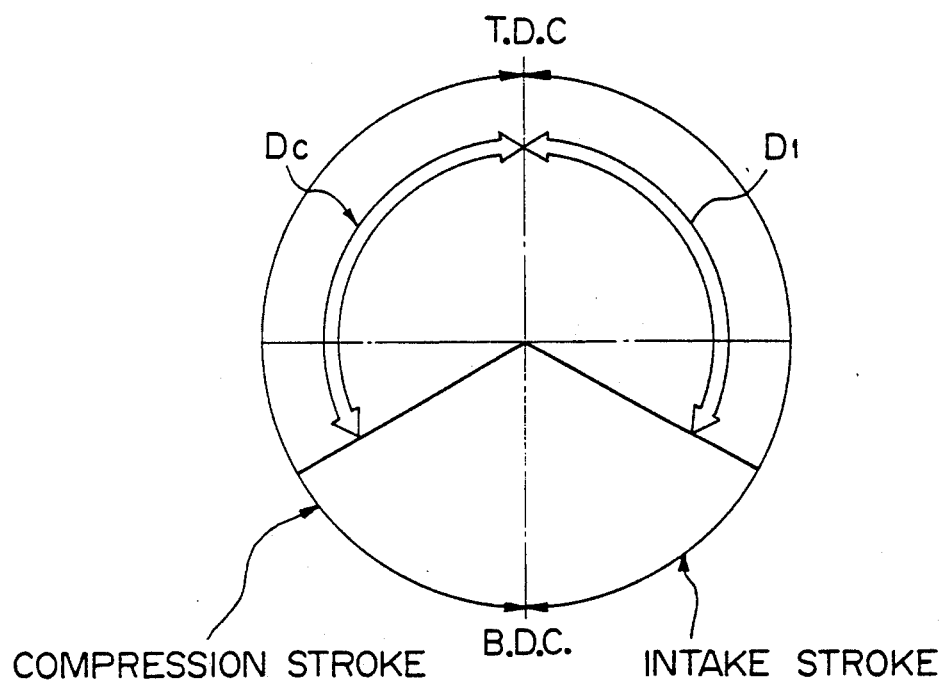
FIG. 6 is a graph of the timing of fuel injection.

As shown in FIG. 6, the intake stroke means the period from the top dead center of the exhaust process to the bottom dead center of the intake process, while the compression stroke means the period from the bottom dead center of the compression process to the top dead center of the compression process.

The injection during the intake stroke is executed during the period shown by $D_I$. This period $D_I$ corresponds to substantially the former half of the intake stroke. The injection during the compression stroke is executed in the period shown by $D_C$. This period $D_C$ corresponds to substantially the latter half of the compression stroke. The fuel is injected in the period $D_I$ or $D_C$, so the injected fuel does not directly strike the cylinder block 60, so almost none of the injected fuel adheres to the inside surface of the cylinder block 60.

In the region from near the medium load (amount of fuel injection $Q_M$) to the low load, as shown in FIG. 4, only the injection during the compression stroke is executed in the latter period of the compression stroke and fuel is injected from the fuel injector 5 toward the spark plug 6 and the depression 63 at the top surface of the piston 62. This injected fuel has a weak penetrating force. Further, the pressure in the cylinder chamber 64 is high and the flow of air is weak. Therefore, the injected fuel tends to concentrate at the region K near the spark plug 6. Since the distribution of fuel in the region K is uneven and changes from a rich air-fuel mixture layer to an air layer, there is a combustible air-fuel mixture layer near the stoichiometric air-fuel ratio which can be most easily burnt. Therefore, the combustible air-fuel mixture layer near the spark plug 6 is easily ignited and the ignited flame propagates throughout the uneven air-fuel mixture layer as a whole to complete the combustion. In this way, in the region from the medium load to the low load, the fuel is injected near the spark plug 6 in the latter period of the compression stroke, whereby a combustible air-fuel mixture layer is formed near the spark plug 6 and therefore excellent ignition and combustion can be obtained.

Figure 7:
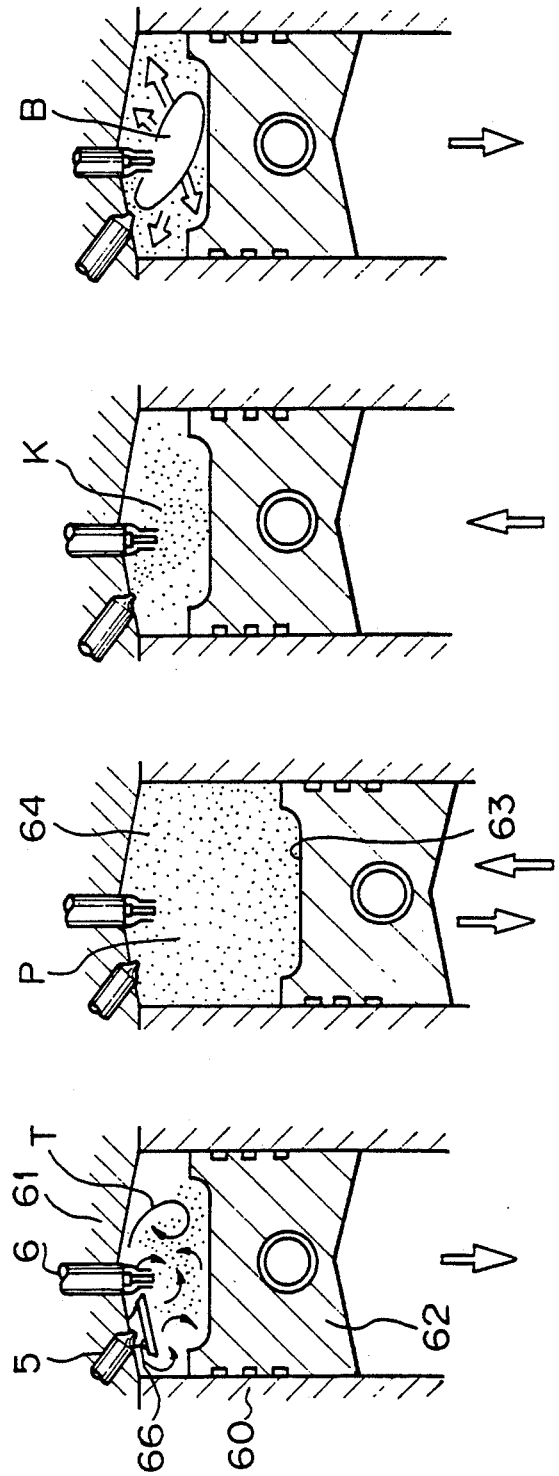
FIG. 7($a$-$d$) are an explanatory view of the operation when injecting fuel in the intake stroke and the compression stroke.

On the other hand, in the region from near the medium load (amount of fuel injection $Q_M$) to the high load, as shown in FIG. 7, the injection during the intake stroke is executed in the early period of the intake stroke (FIG. 7(a)) and fuel is injected from the fuel injector 5 toward the spark plug 6 and the depression 63 of the top surface of the piston 62. This injected fuel is mist-like fuel of a large dispersion angle and a weak penetrating force. Part of the injected fuel floats free in the cylinder chamber 64 and the rest strikes the depression 63. The injected fuel is dispersed in the cylinder chamber 64 by the disturbance T in the cylinder chamber 64 caused by the flow of intake air entering from the intake port to the cylinder chamber 64 and therefore an air-fuel premixture P is formed in the period from the intake stroke to the compression stroke (FIG. 7(b)). The air-fuel ratio of this air-fuel premixture P is an airfuel ratio of an extent where the ignited flame can be propagated. Further, in the state of FIG. 7(b), since the extension of the center axial line of the injected fuel is oriented toward the cylinder chamber, if the penetrating force of the injected fuel is strong, part of the mist is liable to deposit directly on the cylinder walls. In this embodiment, there is no particular problem since the injection is performed with a relatively weak penetrating force, but in the embodiment of the present invention, the effect of prevention of deposition of fuel on the cylinder walls is enhanced by making this period a noninjection period. Next, at the latter period of the compression stroke (FIG. 7(c)), the injection at the compression stroke is executed and fuel is injected from the fuel injector 5 toward the vicinity of the spark plug 6 and the depression 63 in the top surface of the piston 6. Since the injected fuel is directed toward the spark plug 6 and further has a weak penetrating force and since further the pressure inside the cylinder chamber 64 is large, the injected fuel tends to concentrate at the region K near the spark plug 6. The fuel in the region K is uneven in distribution and changes from a rich air-fuel mixture layer to an air layer, so there is a combustible air-fuel mixture layer near the stoichiometric air-fuel ratio, which is most easily burnt, in the region K. Therefore, when the combustible air-fuel mixture layer is ignited by the spark plug 6, combustion proceeds centered in the uneven air-fuel mixture region K (FIG. 7(d)). In this combustion process, the flame propagates successively to the air-fuel premixture P from near the expanded combustion gas B and the combustion is completed. In this way, by injecting fuel in the early period of the intake stroke in the medium load and high load region, an air-fuel mixture for flame propagation is formed the cylinder chamber 64 as a whole and by injecting fuel in the latter period of the compression stroke, a relatively thin air-fuel mixture is formed near the spark plug 6 and therefore an air-fuel mixture for ignition is formed. In particular, if the entire required amount of injection is injected in the intake stroke or in the first half of the compression stroke in medium load operation as in a conventional engine, the injected fuel ends up dispersed in the cylinder chamber 64 as a whole, so the air-fuel mixture formed in the cylinder chamber 64 becomes too thin and there is the problem of difficult ignition and combustion. On the other hand, if the entire required amount of injection is injected in the latter period of the compression stroke in medium load operation, there are the problems that a large amount of smoke is produced and it is not possible to raise the rate of utilization of air, so a sufficiently high output cannot be obtained.

Therefore, as mentioned earlier, during medium load operation, injection is performed divided between the intake stroke and the compression stroke, so an excellent ignition and a high output due to combustion with a high rate of utilization of air are obtained.

Further, near the medium load, the uniform air-fuel mixture formed by the fuel injected in the intake stroke may have an air-fuel ratio of an extent enabling flame propagation, which is thinner than an ignitable air-fuel ratio, so the fuel economy is improved by lean combustion.

In FIG. 5, however, in the period between the amounts of fuel injection $Q_M$ and $Q_H$, that is, the load region where the required amount of fuel injection is divided between the intake stroke and the compression stroke, in the load region on the low load side, that is, in the load region near QM, the suitable ratio of the amount of fuel injection during the intake stroke and the amount of fuel injection during the compression stroke is limited to a narrow range in accordance with the engine operating state, so there is the problem that it is difficult to always obtain an excellent combustion with a small amount of torque fluctuation in this load region.

Therefore, in the first embodiment, in consideration of the fact that if the combustion deteriorates, the amount of torque fluctuation increases, when the amount of torque fluctuation becomes larger than a predetermined amount of torque fluctuation, it is determined that misfiring has occurred and the ratio of the amount of fuel injection during the intake stroke and the amount of fuel injection during the compression stroke is changed so that the amount of torque fluctuation becomes less than the predetermined amount of torque fluctuation.

Figure 8:
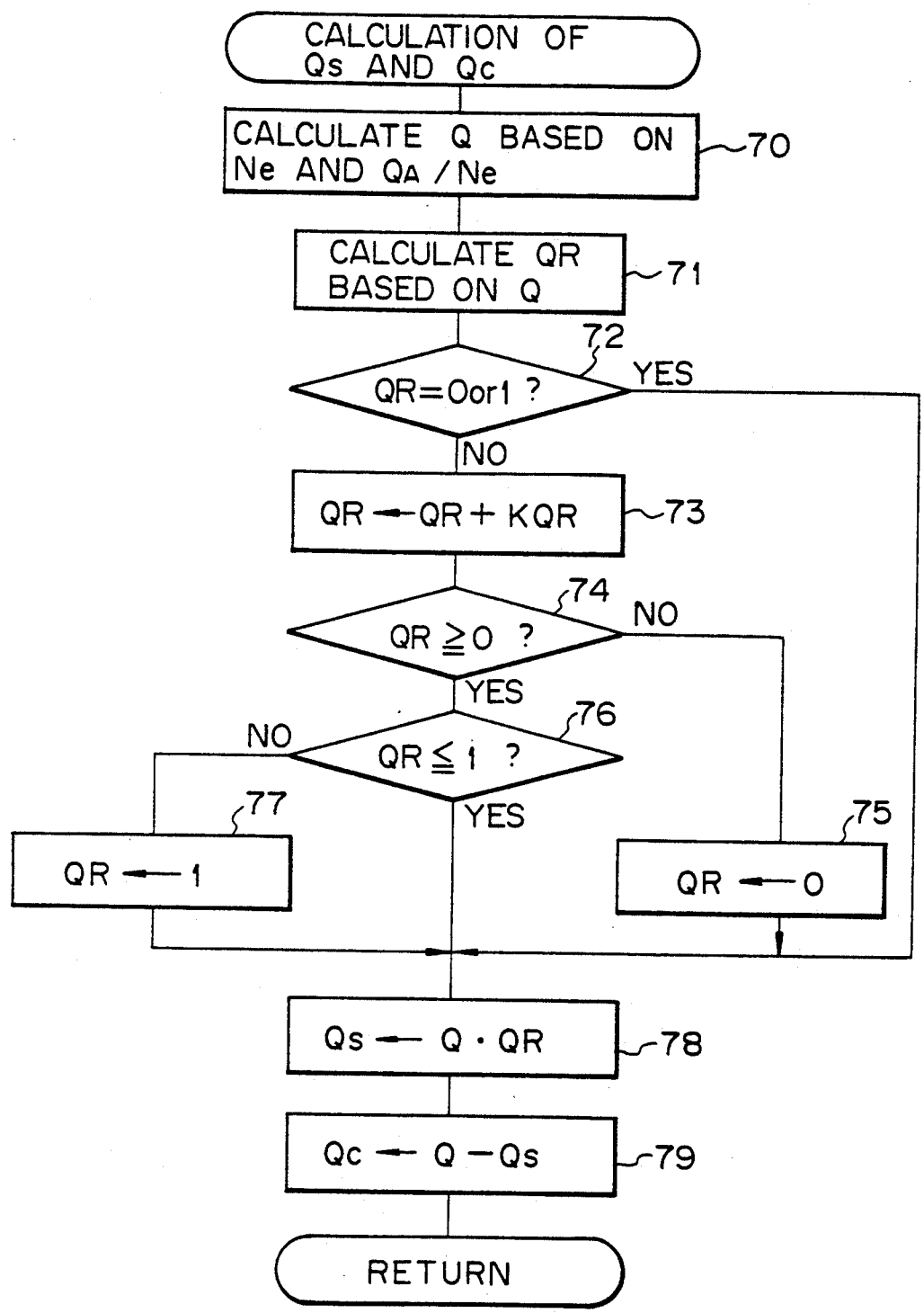
FIG. 8 is a flow chart for calculating the amount of fuel injected in the intake stroke and the compression stroke.

FIG. 8 shows the routine for calculating the amount of fuel injection in the intake stroke and the compression stroke. This routine is executed by interruption every predetermined time period.

Referring to FIG. 8, first, at step 170, the required amount of fuel injection Q is found from a map (see FIG. 9) based on the engine rotational speed Ne and QA/Ne. Here, QA/Ne is the amount of intake air per rotation of the engine and expresses the engine load. Next, at step 71, the division rate QR is calculated based on the required amount of fuel injection Q. Here, the division rate QR is the ratio of the amount of fuel injection in the intake stroke to the required amount of fuel injection Q.

Figures 9, 10:
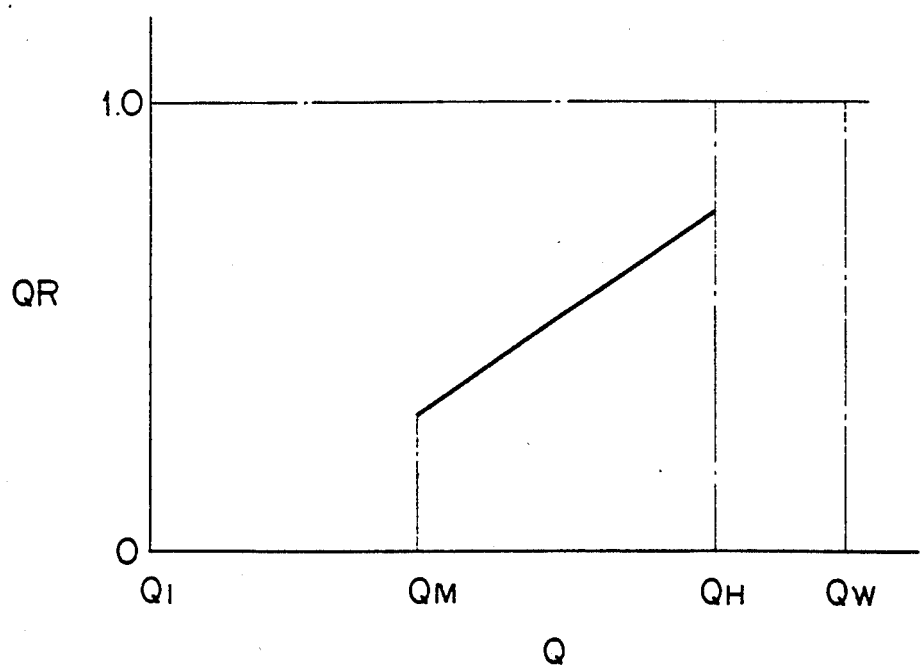
FIG. 9 is a map of the amount of fuel injection Q based on the engine rotational speed Ne and QA/Ne.
FIG. 10 is a map of the rate of division QR based on the amount Q of fuel injection.

The map of the required amount of fuel injection Q and the division rate QR is shown in FIG. 10. FIG. 10 corresponds to FIG. 5. QR is 0 when the required amount of fuel injection Q is from $Q_I$ to $Q_M$. Therefore, the entire required amount of fuel injection Q is injected during the compression stroke. From $Q_M$ to $Q_H$, injection is performed during the intake stroke and the compression stroke, with the ratio of the amount of fuel injection during the intake stroke increasing in accordance with an increase in the load. From $Q_H$ to $Q_W$, QR becomes 1.0 and the entire required amount of fuel injection Q is injected in the intake stroke.

Referring again to FIG. 8, at step 72, it is determined if QR is equal to 0 or 1. When the division rate QR is not equal to 0 or 1, the routine proceeds to step 73, where the correction value KQR is added to QR. The correction value KQR is calculated by the routine shown in FIG. 11, explained later.

At step 74, it is determined if QR is more than 0. If QR<0, the routine proceeds to step 75, where QR is made 0. On the other hand, if QR>0, the routine proceeds to step 76, wherein it is determined if QR≦1. If QR>1, the routine proceeds to step 77, where QR is made 1. If QR≦1, the value of QR is held as it is.

At step 78, the amount of fuel injection in the intake stroke $Q_S$ is calculated by the following equation:

$$Q_S = Q \cdot QR$$

Next, at step 79, the amount of fuel injection of the intake stroke is subtracted from Q so as to calculate the amount of fuel injection during the compression stroke Qc.

If it is determined at step 72 that QR is 0 or 1, step 73 to step 77 are skipped and QR is not corrected, but is maintained as 0 or 1.

Figure 11:
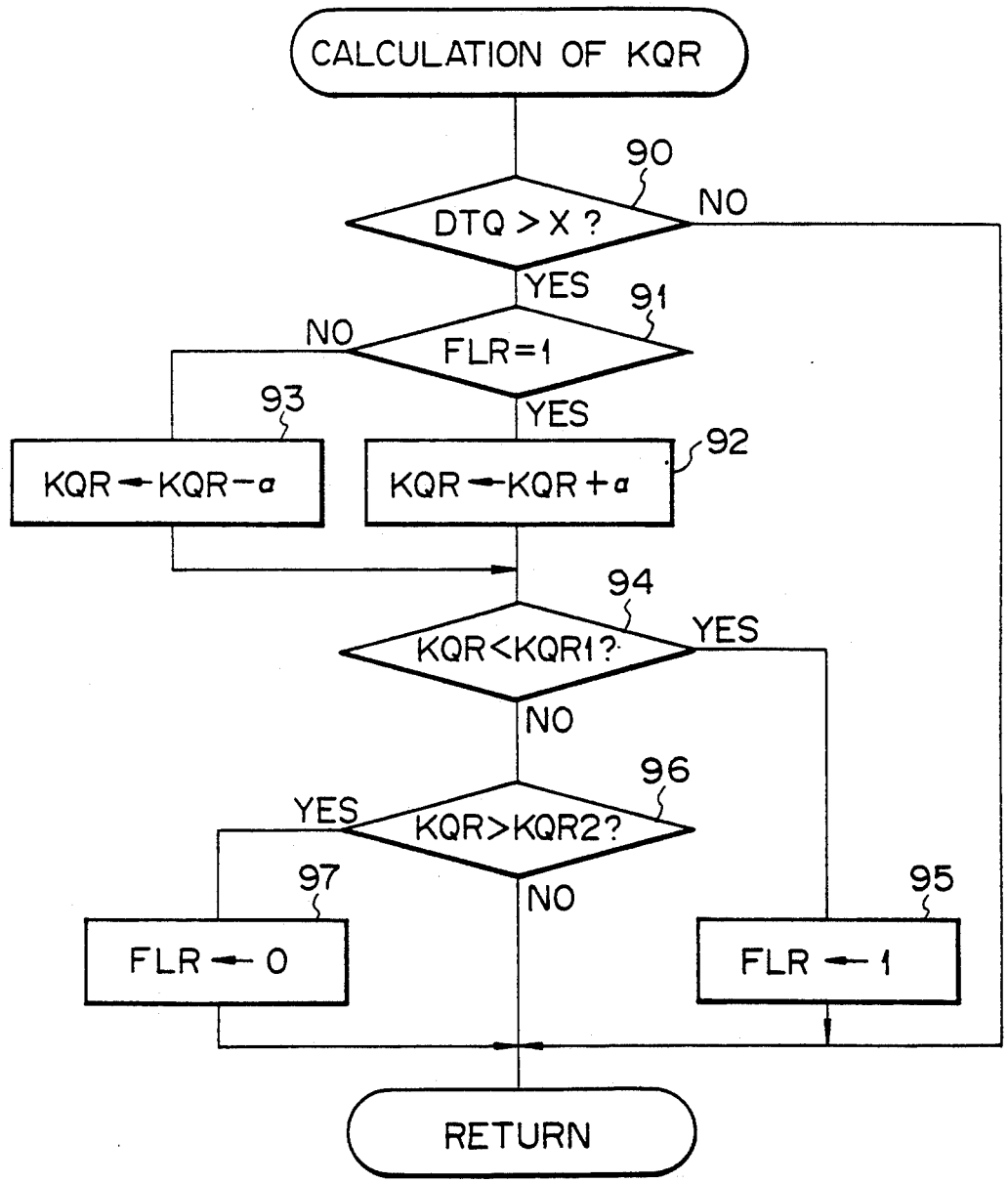
FIG. 11 is a flow chart of a first embodiment for calculating a correction value KQR.

FIG. 11 shows the routine for calculating the correction value KQR. This routine is executed by interruption every predetermined time period.

Referring to FIG. 11, first, at step 90, it is determined if the amount of torque fluctuation DTQ is larger than a predetermined amount of torque fluctuation X. The amount of torque fluctuation DTQ is detected by the routine explained later.

When it is determined that DTQ≦X, that is, when it is determined that excellent combustion is obtained without the occurrence of misfirings, the routine is ended without changing the correction value KQR. On the other hand, when it is determined that DTQ>X, that is, when it is determined that misfirings occur and that excellent combustion cannot be obtained, the routine proceeds to step 91. At step 91, it is determined if the rich flag FLR is set to 1. The rich flag FLR is a measure for determining if the air-fuel mixture near the spark plug at the time of ignition is rich. When the rich flag FLR is set to 1, it is determined that the air-fuel mixture is rich.

When the determination at step 91 is negative, that is, when it is determined that rich misfirings occur due to the air-fuel mixture near the spark plug at the time of ignition being rich, the routine proceeds to step 92, where the correction value KQR is increased by exactly α. By this, the division rate QR is increased (see step 73 in FIG. 8) and therefore the ratio of the amount of fuel injection at the compression stroke is reduced and it is possible to make the air-fuel mixture near the spark plug at the time of ignition leaner. As a result, rich misfirings are prevented and excellent combustion can be obtained. At this time, the amount of torque fluctuation DTQ becomes smaller than X, so the determination at step 90 is negative and therefore the correction value KQR is subsequently not changed.

On the other hand, when the determination is negative at step 91, that is, when it is determined that lean misfiring has occurred due to the air-fuel mixture near the spark plug at the time of ignition being lean, the routine proceeds to step 93, where the correction value KQR is reduced by exactly α. By this, the division rate QR is reduced and therefore the ratio of the amount of fuel injection at the compression stroke is increased and the air-fuel mixture near the spark plug at the time of ignition can be made richer. As a result, lean misfirings are prevented and excellent combustion can be obtained. At this time, since the amount of torque fluctuation DTQ becomes smaller than X, a negative determination is made at step 90, so the correction value KQR is subsequently not changed.

At step 94, it is determined if the correction value KQR is smaller than a predetermined lower limit KQR1.

When the correction value KQR is smaller, the division rate QR becomes smaller (see step 73 in FIG. 8). If the division rate QR is small, the ratio of the amount of fuel injection in the compression stroke becomes larger, so the air-fuel mixture near the spark plug at the time of ignition becomes richer. Therefore, in the case where the correction value KQR is small, such as when KQR<KQR1, it is determined that the air-fuel mixture near the spark plug at the time of ignition is rich and at step 95, the rich flag FLR is set to 1.

On the other hand, when KQR≧KQR1, the routine proceeds to step 96, where it is determined if the correction value KQR is larger than the predetermined upper limit KQR2. Here, KQR2≧KQR1. When the correction value KQR is larger, the division rate QR also becomes larger (see step 73 in FIG. 8). If the division rate QR is large, the ratio of the amount of fuel injection at the compression stroke becomes smaller, so the air-fuel mixture near the spark plug at the time of ignition becomes lean. Therefore, in the case where the correction value KQR is large such as when KQR>KQR2, it is determined that the air-fuel mixture near the spark plug at the time of ignition is lean and at step 97 the rich flag FLR is reset to 0.

On the other hand, when KQR≦KQR2, the rich flag FLR is not changed.

In the above way, in this routine, when the amount of torque fluctuation DTQ is larger than X, when the rich flag FLR is set to 1, the correction value KQR is increased in increments of α, while when the rich flag FLR is reset to 0, the correction value KQR is decreased in decrements of α. During this time, if the amount of torque fluctuation DTQ becomes less than X, the changing of the correction value KQR is stopped. Further, the rich flag FLR is set to 1 when the correction value KQR becomes less than the lower limit KQR1 and is reset to 0 when the correction value KQR becomes larger than the upper limit KQR2.

In this way, when the amount of torque fluctuation DTQ is larger than a predetermined value X, the amount of torque fluctuation DTQ is made to become smaller than the predetermined value X. That is, the division rate QR is controlled so that the amount of torque fluctuation DTQ becomes less than the predetermined value X, so when fuel is injected in the intake stroke and the compression stroke, excellent combustion can be obtained.

Next, an explanation will be made of the calculation of the amount of torque fluctuation DTQ.

Figure 12:
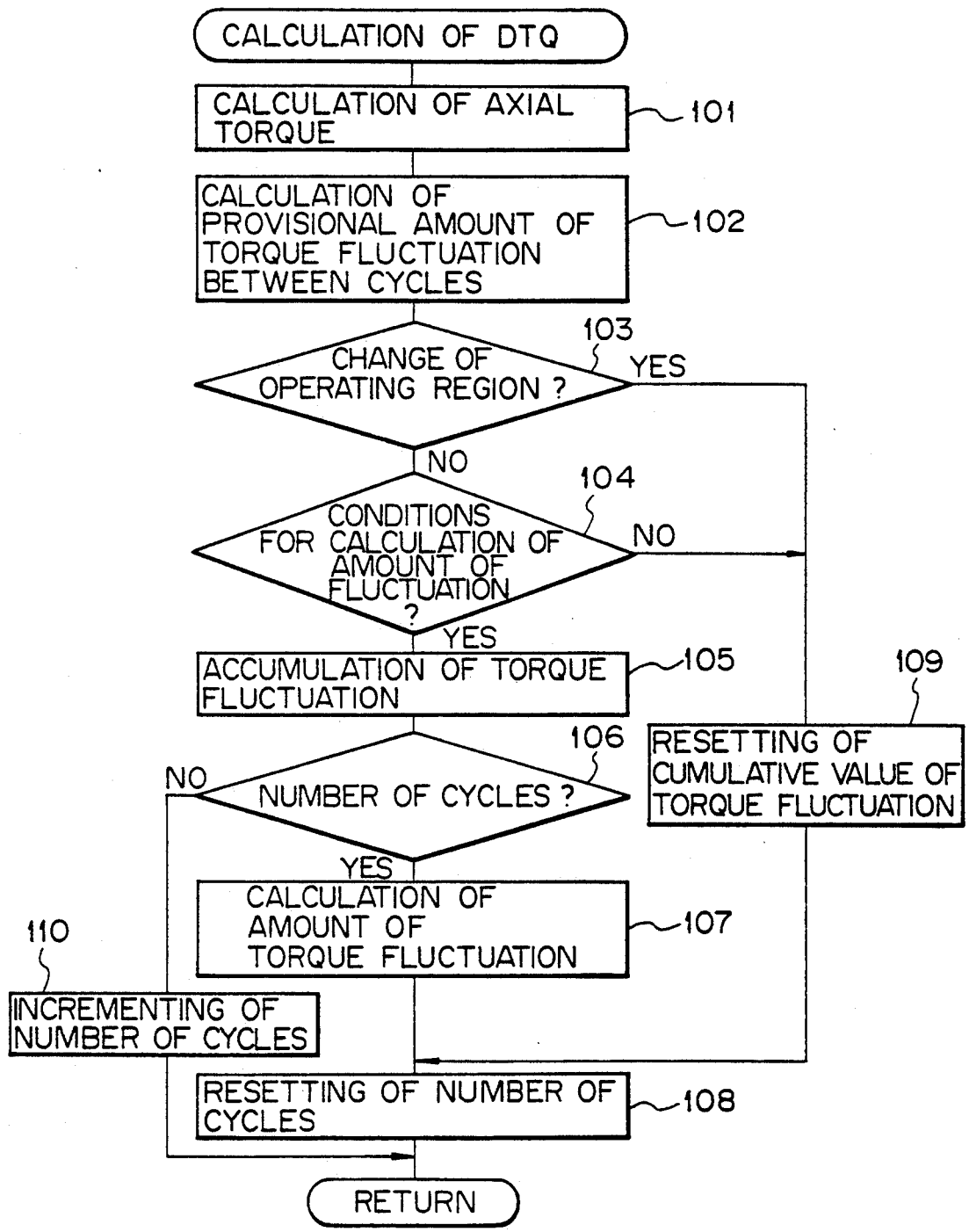
FIG. 12 is a flow chart for calculating an amount of torque fluctuation DTQ.

FIG. 12 show the routine for calculating the amount of torque fluctuation DTQ. This routine is executed by interruption every 720 degrees crank angle.

Referring to FIG. 12, first, at step 101, the axial torque is calculated based on the combustion pressure in the cylinder.

Figure 13:
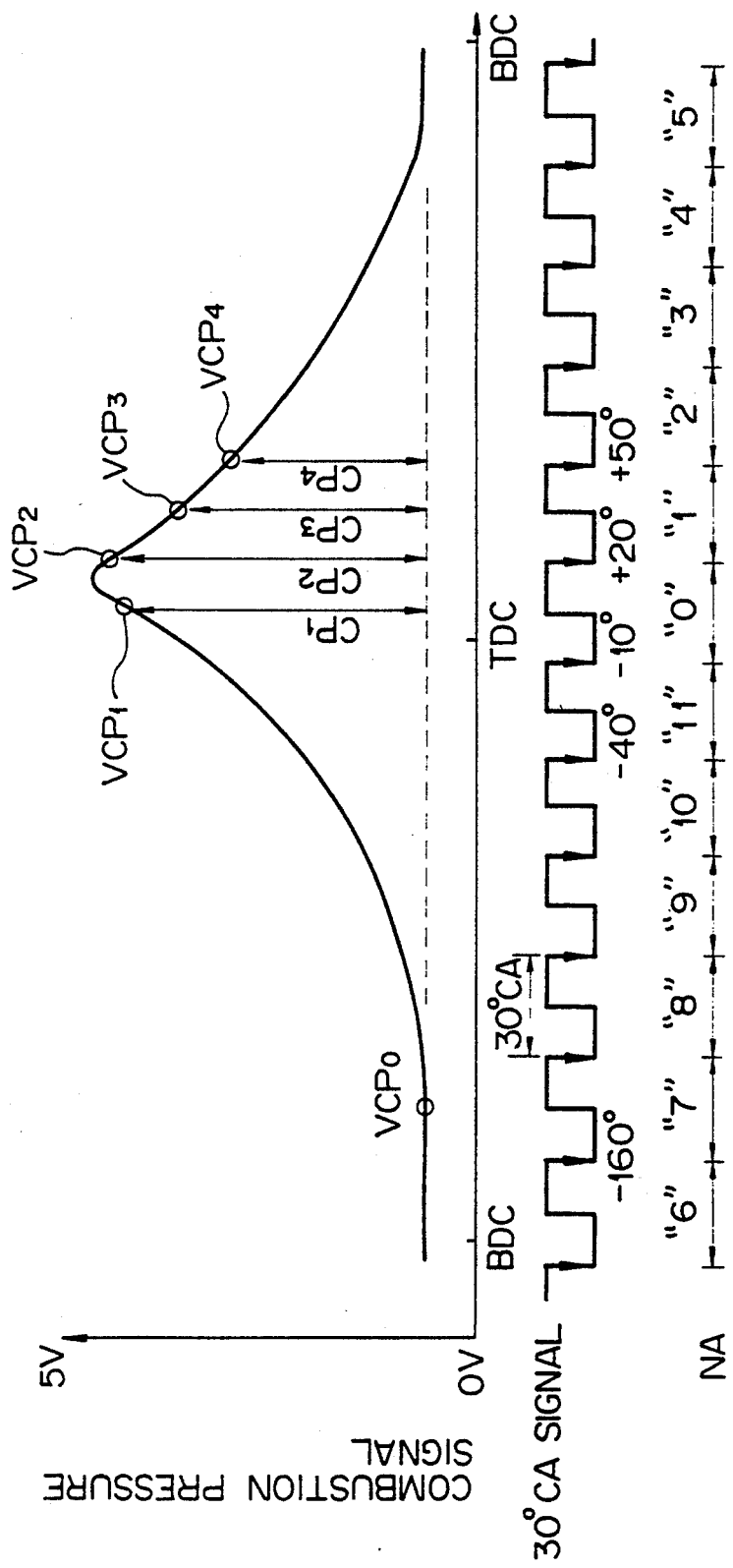
FIG. 13 is a graph of the crank angle positions for detection of combustion pressure signals.

The combustion pressure, as shown by FIG. 13, is detected at the timings of the crank angles of BTDC155° CA (155° before top dead center), ATDC° 5CA (5° after top dead center), ATDC20° CA, ATDC35° CA, and ATDC50° CA based on the crank angle detection signals. The combustion pressure signal $VCP_0$ when the crank angle is BTDC155° CA is made the reference value for the combustion pressure at other crank positions since the output drift due to the temperature of the cylinder pressure sensor 39 etc., variations in the offset voltage, etc. are absorbed.

The combustion pressure signals at the crank angles ATDC° 5CA, ATDC20° CA, ATDC35° CA, and ATDC50° CA are shown by $VCP_1$, $VCP_2$, $VCP_3$, and $VCP_4$ in FIG. 13. Note that in FIG. 13, NA is the value of the angle counter NA which is incremented with every 30° CA interruption and is cleared with every 360° CA. The positions of ATDC° 5CA and ATDC35° CA do not match with the timings of interruption of 30° CA signals, so for the A/D conversion at the ATDC° 5CA and ATDC35° CA, a timer is set with 15° CA time at the 30° CA interruption just before (NA="0", "1") and the CPU 32 is interrupted by that timer.

The axial torque is calculated in the following manner.

First, the combustion pressure $CP_n$ based on the $VCP_0$ is calculated by the following equation (wherein n=1 to 4):

$$CP_n = K_1 \times (VCP_n - VCP_0) \quad (1)$$

In the equation, $K_1$ is a coefficient for converting the combustion pressure signal to combustion pressure. Next, the axial torque PTRQ is calculated for every cylinder by the following equation:

$$PTRQ = K_2 \times (0.5 CP_1 + 2 CP_2 + 3 CP_3 + 4 CP_4) \quad (2)$$

wherein, $K_2$ is a coefficient for converting the combustion pressure to a torque.

Next, at step 102, the provisional amount of torque fluctuation DTRQ between cycles is calculated for each cylinder based on the following equation:

$$DTRQ = PTRQ_{i-1} - PTRQ_i \quad (DTRQ \geq 0) \quad (3)$$

That is, only when the value DTRQ obtained by subtracting the current axial torque $PTRQ_i$ from the previous axial torque $PTRQ_{i-1}$ is positive, in other words, only when the torque is reduced is it deemed that torque fluctuation has occurred. This is because when the DTRQ is negative, it can be deemed that the torque changes in accordance with the ideal torque.

Next, the routine proceeds to step 103, where it is determined if the current operating region $NOAREA_i$ changes from the previous operating region $NOAREA_{i-1}$. When it does not change, the routine proceeds to the next step 104, where it is determined if the conditions for calculation of the amount of torque fluctuation stand. Conditions under which the amount of torque fluctuation is not calculated are times of deceleration, times of idling, engine startup, engine warmup, EGR on, fuel cuts, etc. Therefore, when none of these conditions exist, it is deemed that the conditions for calculation of the amount of torque fluctuation stand and the routine proceeds to the next step 105. Note that the determination of deceleration is made when the provisional amount of torque fluctuation DTRQ is positive, for example, five or more times in a row.

At times of deceleration, it is not possible to discriminate between a reduction of the torque accompanying the reduction of the amount of intake air and a fall in the torque accompanying a deterioration of combustion, so the control of the engine by the amount of torque fluctuation is stopped. At step 105, the cumulative value $DTRQ_i$ of the provisional amount of torque fluctuation is calculated by the following equation:

$$DTRQ10_i = DTRQ10_{i-1} + DTRQ \quad (4)$$

That is, the currently calculated provisional amount of torque fluctuation DTRQ is added to the previous cumulative amount of torque fluctuation $DTRQ10_{i-1}$.

Next, it is determined if the number of cycles CYCLE10 is more than a predetermined value (for example, 10) (step 106). When less than the predetermined value, the number of cycles CYCLE10 is incremented by exactly "1" (step 110), then the routine is ended and the above-mentioned processing is again started.

In this way, since the cumulative amount of torque fluctuation obtained by repeating the routine of FIG. 12 a predetermined number of times is deemed to correspond to substantially the accurate amount of torque fluctuation, the routine proceeds from step 106 to step 107 where the amount of torque fluctuation DTQ is calculated by the following equation:

$$DTQ = 1/16 \, (DTRQ10_i; DTQ_{i-1}) + DTQ_{i-1} \quad (5)$$

As understood from equation (5), the amount of torque fluctuation DTQ is a value which reflects the value 1/16th the current cumulative amount of torque fluctuation $DTRQ10_i$ minus the previous amount of torque fluctuation $DTRQ_{i-1}$.

When the calculation of the amount of torque fluctuation DTQ is ended, the number of cycles CYCLE10 is reset to zero (step 108), then the processing is ended.

Note that when it is determined at step 103 that the operating region has changed or when it is determined at step 104 that the conditions for determination of fluctuation are not met, the routine proceeds to step 109, where the cumulative amount of torque fluctuation DTRQ10 is reset to zero, then at step 108 the number of cycles CYCLE10 is reset.

Note that in this embodiment, the amount of torque fluctuation DTQ is found using the combustion pressure, but it is possible not to use the combustion pressure, but to find it from the fluctuation of the engine rotational speed Ne.

Next, an explanation will be made of the second embodiment. The second embodiment differs from the first embodiment in only the method of calculation of the correction value KQR.

Figure 14:
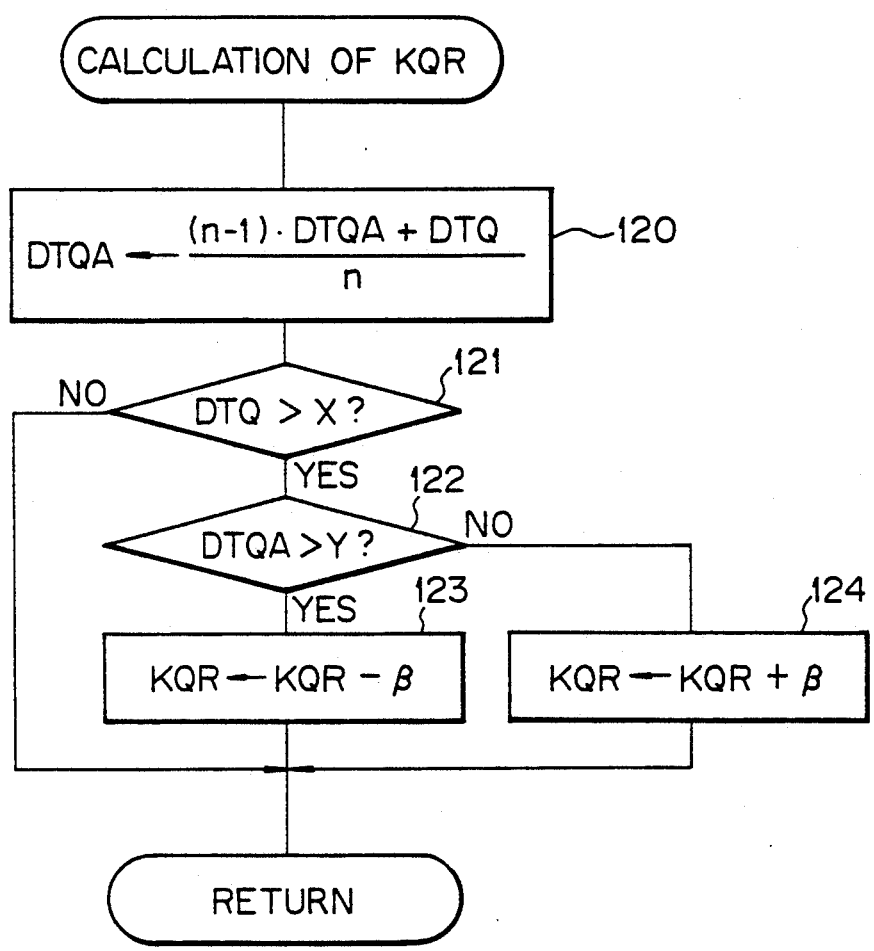
FIG. 14 is a flow chart of a second embodiment for calculating a correction value KQR.

FIG. 14 shows the routine of the second embodiment for calculating the correction value KQR. This routine is executed by interruption every predetermined time period.

Referring to FIG. 14, first, at step 120, the average amount of torque fluctuation DTQA is updated by the following equation:

$$\{(n-1)\cdot dTQA + DTQ\}/n$$

As understood from this equation, a weight of $n-1$ is given to DTQA and a weight of 1 is given to DTQ so as to renew DTQA.

At step 121, it is determined if the amount of torque fluctuation DTQ is larger than a predetermined value X.

When it is determined that DTQ≦X, that is, when it is determined that excellent combustion has been performed without misfirings, the routine is ended without changing the correction value KQR.

On the other hand, when it is determined that DTQ>X, that is, when it is determined that misfiring occurs and excellent combustion is not obtained, the routine proceeds to step 122, where it is determined if the average amount of torque fluctuation DTQA is larger than a predetermined value Y.

Figure 15:
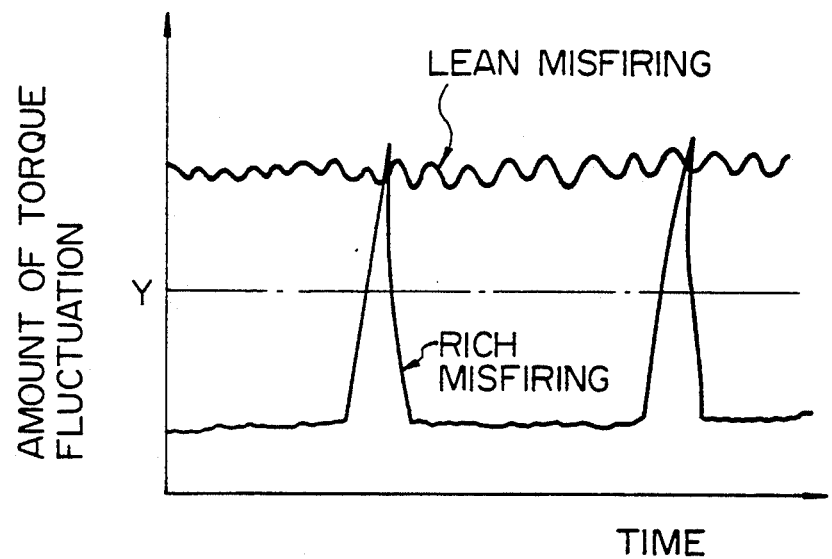
FIG. 15 is a graph showing the torque fluctuation at the time of lean misfiring and rich misfiring.

FIG. 15 shows the torque fluctuation in the case of misfiring due to a lean air-fuel mixture and misfiring due to a rich air-fuel mixture. In the case of lean misfiring, the amount of torque fluctuation is always large and therefore the average amount of torque fluctuation DTQA becomes larger. On the other hand, in the case of rich misfiring, the amount of torque fluctuation only sporatically becomes larger, so the average amount of torque fluctuation DTQA becomes considerably smaller than the case of rich misfiring. Therefore, by making the determination value Y the value as shown in FIG. 15, it is possible to determine if there has been rich misfiring when DTQA>Y and there has been lean misfiring when DTQA≦Y.

Therefore, when the determination at step 122 of FIG. 14 is affirmative, that is, when it is determined that lean misfiring has occurred due to the air-fuel mixture near the spark plug at the time of ignition being lean, the routine proceeds to step 123, where the correction coefficient KQR is reduced by exactly $\beta$. By this, the division rate QR is reduced (see step 73 in FIG. 8) and therefore the ratio of the amount of fuel injection at the compression stroke is increased and it is possible to make the air-fuel mixture near the spark plug at the time of ignition richer. As a result, lean misfirings are prevented and it is possible to obtain excellent combustion.

On the other hand, when the decision is no at step 122, that is, when it is determined that a rich misfiring has occurred due to the air-fuel mixture near the spark plug at the time of ignition being rich, the routine proceeds to step 124 where the correction coefficient KQR is increased by exactly $\beta$. By this, the division rate QR is increased (see step 73 in FIG. 8) and therefore the ratio of the amount of fuel injection at the compression stroke is reduced and it is possible to make the air-fuel mixture near the spark plug at the time of ignition leaner. As a result, rich misfirings are prevent and it is possible to obtain excellent combustion.

Next, an explanation will be made of a third embodiment. The third embodiment differs from the first and second embodiments only in the method of calculation of the correction value KQR. In this embodiment, the correction value KQR is changed so as to obtain the minimum amount of torque fluctuation DTQ.

Figure 16:
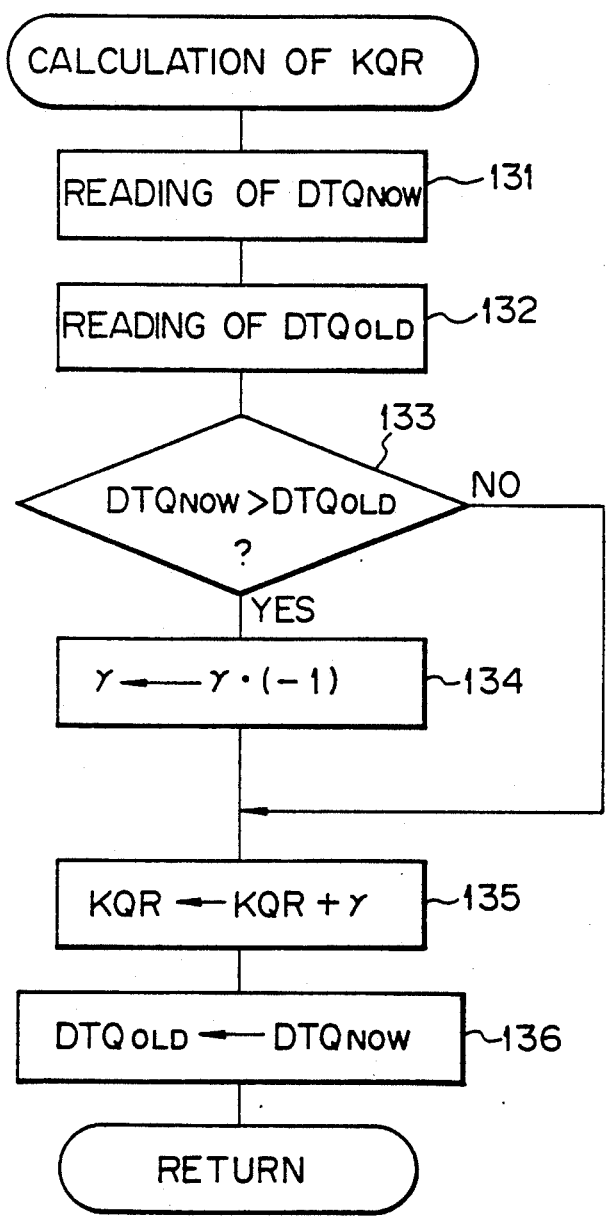
FIG. 16 is a flow chart of a third embodiment for calculating a correction value KQR.

FIG. 16 shows the routine of the third embodiment for calculating a correction value KQR. This routine is executed, for example, by interruption every 10 msec.

Referring to FIG. 16, the current amount of torque fluctuation $DTQ_{NOw}$ is read at step 131. Then, at step 132, the previous amount of torque fluctuation $DTQ_{OLD}$ detected at the previous processing cycle is read.

At step 133, it is determined if the current amount of torque fluctuation $DTQ_{NOW}$ is larger than the previous amount of torque fluctuation $DTQ_{OLD}$. When $DTQ_{NOW} > DTQ_{OLD}$, that is, when the current amount of torque fluctuation $DTQ_{NOW}$ is larger than the previous amount of torque fluctuation $DTQ_{OLD}$, the routine proceeds to step 134, where $-1$ is multiplied with $\gamma$. Here, $\gamma$ is a predetermined constant. When $DTQ_{NOW} \leq DTQ_{OLD}$, that is, when the current amount of torque fluctuation $DTQ_{NOW}$ is less than the previous amount of torque fluctuation $DTQ_{OLD}$, step 134 is skipped and therefore the sign of $\gamma$ is not changed.

At step 135, the correction value KQR is corrected by adding $\gamma$ to the correction value KQR. When $\gamma$ is positive, addition is performed, while when $\gamma$ is negative, in essence subtraction is performed.

At step 133 to step 135, if the current amount of torque fluctuation $DTQ_{NOW}$ is reduced from the previous amount of torque fluctuation $DTQ_{OLD}$, the sign of $\gamma$ is not changed and at step 135, $\gamma$ continues to be added to or subtracted from the correction value KQR. On the other hand, when the current amount of torque fluctuation $DTQ_{NOW}$ becomes larger than the previous amount of torque fluctuation $DTQ_{OLD}$, the sign of $\gamma$ is changed at step 134, whereby at step 135, if addition had been performed the previous time, subtraction is performed the current time or if subtraction had been performed the previous time, addition is performed the current time.

At step 136, the current amount of torque fluctuation DTQNow is stored in the DTQoLD and kept for the next processing cycle.

As mentioned above, according to the present embodiment, it is possible to minimize the amount of torque fluctuation by controlling the correction value KQR.

Therefore, when injecting fuel in the intake stroke and the compression stroke, excellent combustion can be obtained.

Note that while this embodiment showed the use of a single fuel injector to perform the fuel injection in the intake stroke and the fuel injection in the compression stroke, it is possible to add port fuel injectors at the intake ports of the cylinders and use these port fuel injectors to perform the injection at the intake stroke.

Although the present invention has been described with reference to specific embodiments chosen for purposes of illustration, it should be apparent that numerous modifications can be made thereto without departing from the basic concept and scope of the invention.

I claim:

1. A control device for an internal combustion engine having a cylinder and a spark plug, said control device comprising:
   a fuel feeding means for feeding fuel into the cylinder, feeding a part of an amount of fuel to be injected during an intake stroke to form an air-fuel premixture, and feeding the remaining part of said amount of fuel to be injected during a compression stroke to form an air-fuel mixture around the spark plug for ignition;
   a torque fluctuation detecting means for detecting an amount of torque fluctuation of the internal combustion engine; and
   a fuel feeding control means for controlling a ratio of said part of said amount of fuel to be injected to said amount of fuel to be injected so that said amount of torque fluctuation detected by said torque fluctuation detecting means decreases.

2. A control device as set forth in claim 1, wherein said fuel feeding control means controls said ratio so that said amount of torque fluctuation is less than a predetermined amount.

3. A control device as set forth in claim 2, wherein said fuel feeding control means controls said ratio by adding a correction value.

4. A control device as set forth in claim 3, wherein said fuel feeding control means does not change said correction value when said amount of torque fluctuation is smaller than a predetermined amount of torque fluctuation, and changes said correction value when said amount of torque fluctuation is larger than said predetermined amount of torque fluctuation.

5. A control device as set forth in claim 4, wherein, when said amount of torque fluctuation is larger than said predetermined amount of torque fluctuation, said fuel feeding control means increases said correction value when an air-fuel mixture around the spark plug at ignition is rich, and decreases said correction value when the air-fuel mixture around the spark plug at ignition is lean.

6. A control device as set forth in claim 5, wherein it is determined that the air-fuel mixture around the spark plug at ignition is rich when said correction value is smaller than a predetermined first value, and it is determined that the air-fuel mixture around the spark plug at ignition is lean when said correction value is larger than a predetermined second value which is larger than said predetermined first value.

7. A control device as set forth in claim 5, wherein said fuel feeding control means calculates an average of said amount of torque fluctuation, and wherein it is determined that the air-fuel mixture around the spark plug at ignition is rich when said average of said amount of torque fluctuation is smaller than a predetermined torque fluctuation value, and it is determined that the air-fuel mixture around the spark plug at ignition is lean when said average of said amount of torque fluctuation is larger than said pedetermined torque fluctuation value.

8. A control device as set forth in claim 1, wherein said fuel feeding control means controls said ratio so that said amount of torque fluctuation detected by said torque fluctuation detecting means is minimum.

9. A control device as set forth in claim 8, wherein said fuel feeding control means controls said ratio by adding a correction value.

10. A control device as set forth in claim 9, wherein said correction value is increased or decreased by a constant value so that said amount of torque fluctuation is minimum.

11. A control device as set forth in claim 10, wherein said torque fluctuation detecting means successively detects said amount of torque fluctuation, a sign of said constant value is not changed when an amount of torque fluctuation detected at a present time is smaller than an amount of torque fluctuation detected at a time immediately preceding, and the sign of the said constant value is changed when the amount of torque fluctuation detected at a present time is larger than the amount of torque fluctuation detected at a time immediately preceding.

12. A control device as set forth in claim 1, wherein said torque fluctuation detecting means detects said amount of torque fluctuation on the basis of an engine speed.

13. A control device as set forth in claim 1, wherein said torque fluctuation detecting means detects said amount of torque fluctuation on the basis of a combustion pressure.

14. A control device as set forth in claim 1, wherein said fuel feeding means has a single fuel injector in each cylinder, said fuel injector injects said part of said amount of fuel to be injected during the intake stroke and injects said remaining part of said amount of fuel to be injected during the compression stroke.

15. A control device as set forth in claim 1, wherein said fuel feeding means has a first fuel injector arranged in the cylinder and a second fuel injector which injects fuel in an intake port, said second fuel injector injects said part of said amount of fuel to be injected during the intake stroke, and said first fuel injector injects said remaining part of said amount of fuel to be injected during the compression stroke.

* * * * *

UNITED STATES PATENT AND TRADEMARK OFFICE
CERTIFICATE OF CORRECTION

PATENT NO. : 5,331,933
DATED : July 26, 1994
INVENTOR(S) : Souichi MATSUSHITA

It is certified that error appears in the above-indentified patent and that said Letters Patent is hereby corrected as shown below:

Column 7, line 33, change "?" to --?--.

Column 8, line 49, change "?" to --?--.

Column 10, line 26, "At step 105" should begin new paragraph.

Column 10, line 30, change "DTRQ(4)" to --...+DTRQ (4)--.

Column 11, line 15, change "dTQA" to --DTQA--.

Column 12, line 13, change "DTQNOw" to --$DTQ_{NOW}$--.

Column 12, line 48, change "DTQoLD" to --$DTQ_{OLD}$--.

Signed and Sealed this

Twenty-seventh Day of December, 1994

Attest:

BRUCE LEHMAN

Attesting Officer   Commissioner of Patents and Trademarks